United States Patent

Blackmer

[11] Patent Number: 5,821,851
[45] Date of Patent: Oct. 13, 1998

[54] VEHICLE DECELERATION SENSOR AND INDICATOR

[75] Inventor: Stephen Christopher Blackmer, Novi, Mich.

[73] Assignee: Yazaki Corporation, Tokyo, Japan

[21] Appl. No.: 886,613

[22] Filed: Jul. 1, 1997

[51] Int. Cl.[6] .................................................. B60Q 1/50
[52] U.S. Cl. ................. 340/467; 340/479; 200/61.45 R; 200/61.52
[58] Field of Search ..................................... 340/467, 463, 340/464, 468, 478, 479; 200/61.45 R, 61.46, 61.52, 61.48, 61.51; 73/488, 504.01, 504.02, 514.01, 514.02, 514.36, 535, 536, 539

[56] References Cited

U.S. PATENT DOCUMENTS

| | | | |
|---|---|---|---|
| 3,567,956 | 3/1971 | McNiel | 340/467 |
| 3,882,449 | 5/1975 | Bouchard | 340/467 |
| 4,055,090 | 10/1977 | Fuchs | 73/510 |
| 4,107,647 | 8/1978 | Yoshino | 340/467 |
| 4,117,450 | 9/1978 | Lavalley | 200/61.45 R |
| 4,320,384 | 3/1982 | Carlson | 340/467 |
| 4,556,862 | 12/1985 | Meinershagen | 340/479 |
| 4,983,953 | 1/1991 | Page | 340/467 |
| 5,089,805 | 2/1992 | Salsman | 340/467 |
| 5,309,141 | 5/1994 | Mason et al. | 340/467 |
| 5,376,918 | 12/1994 | Vinciguerra | 340/479 |
| 5,442,333 | 8/1995 | Bailey | 340/467 |
| 5,450,049 | 9/1995 | Bachmann | 335/205 |
| 5,486,808 | 1/1996 | Nejdl | 340/464 |
| 5,499,011 | 3/1996 | Young | 340/479 |

Primary Examiner—Jeffery A. Hofsass
Assistant Examiner—Toan N. Pham
Attorney, Agent, or Firm—Young & Basile, P.C.

[57] ABSTRACT

An inertial sensor for measuring the rate of deceleration experienced by a vehicle includes a pendulum fixed to a horizontally disposed shaft, each end of which is connected to the selector knob of a rotary electrical switch. The rotary switches are mounted to the vehicle such that the axis of the shaft is perpendicular to the direction in which deceleration is to be measured. Each of the rotary switches is connected to a separate electric circuit comprising a plurality of cascaded circuit loops, each circuit loop supplying power to a single indicator lamp in a lamp array mounted on the rear of the vehicle. Deceleration of the vehicle causes the pendulum to swing forward with respect to the vehicle's direction of motion, rotating the selector knobs so that each rotary switch sequentially closes the cascaded circuit loops, such that greater rotation of the selector knob results in a greater number of lamps being illuminated. The number of lamps illuminated indicates to the driver of a trailing vehicle how rapidly the vehicle using the invention system is decelerating. The lamp array has two groups of lamps, each group energized by a separate circuit connected to one of the two rotary switches. A backstop mounted to the vehicle immediately behind the pendulum prevents the pendulum from swinging rearwardly due to acceleration of the vehicle.

11 Claims, 2 Drawing Sheets

VEHICLE DECELERATION SENSOR AND INDICATOR

FIELD OF THE INVENTION

This invention relates in general to safety devices for reducing the likelihood of vehicle rear-end collisions, and more specifically to a safety device that measures the rate of deceleration experienced by a vehicle and provides a signal indicating the rate of deceleration visible to traffic following behind the equipped vehicle.

BACKGROUND OF THE INVENTION

The brake lights currently installed on automotive vehicles have several practical limitations. While the brake lights illuminate to indicate when a vehicle's braking system is activated, they do not provide an indication of how hard the brakes are applied or whether the vehicle is actually decelerating. A slight depression of the brake pedal may illuminate the brake lights without the brakes actually being activated by the hydraulic system. Some drivers "ride the brakes," illuminating the brake lights continually without slowing the vehicle to any substantial degree.

Furthermore, conventional brake lights do not indicate the rate of deceleration experienced by the vehicle. A driver may apply the brakes lightly to slow down a small amount, or may brake hard to avoid a collision or running a red light, with both of these brake applications presenting the identical visual indication to a vehicle following behind. In addition, downshifting a manual transmission may significantly slow a vehicle without any brake light indication to a following vehicle. In the event of a collision with a stationary vehicle or other object, a vehicle may decelerate rapidly without any application of the brakes to alert following traffic. In any of these situations, a driver of the trailing vehicle has little or no forewarning of the deceleration of the lead vehicle, and thus has a reduced amount of time to react.

It is known in the prior art to provide systems for detecting vehicle deceleration and indicating the rate of the deceleration by means of a plurality of sequentially illuminated warning lights. In U.S. Pat. No. 5,089,805, a plurality of mercury switches sequentially activates a series of lights depending on the intensity of deceleration experienced by the vehicle. U.S. Pat. No. 5,499,011 teaches a device in which vehicle deceleration causes a plurality of pendula of varying lengths to swing forward and impact a printed circuit board having switches formed thereon. The impact closes the switches to illuminate indicator lights.

SUMMARY OF THE INVENTION

It is an object of this invention to provide a deceleration sensor and indicator system that is reliable, simple, and inexpensive to manufacture and install in a vehicle.

Another object of this invention is to furnish a sensor and indicator system which indicates deceleration regardless of whether a vehicle's braking system is activated.

A further object of this invention is to provide an indication of the rate of deceleration of a vehicle in a manner which is easily and quickly interpreted by persons outside the vehicle.

In the illustrative embodiment of the invention described and depicted herein, a pendulum is fixed to a shaft and each end of the shaft is connected to the selector knob of a rotary electrical switch. The two rotary switches are mounted to the vehicle such that the axis of the shaft is horizontal and perpendicular to the axis along which deceleration is to be measured, usually the longitudinal axis of the vehicle. The pendulum and shaft are free to rotate with respect to the vehicle, and rotation of the shaft turns the selector knobs to actuate the rotary switches. A backstop mounted to the vehicle immediately behind the pendulum prevents the pendulum from swinging rearwardly due to acceleration of the vehicle.

Each of the rotary switches is connected to a separate electric circuit comprising a plurality of cascaded circuit loops, each circuit loop supplying power to a single indicator lamp in a lamp array mounted on the rear of the vehicle. Rotation of the selector knob causes each rotary switch to sequentially close the cascaded loops such that greater rotation of the selector knob results in a greater number of lamps being illuminated.

When the vehicle experiences deceleration, whether resulting from braking, downshifting of the transmission, a collision, or some other event, inertia causes the pendulum to swing forward with respect to the vehicle. The forward motion of the pendulum rotates the shaft about its axis, and this rotation turns the rotary switch selector knobs. Contacts within each rotary switch are closed sequentially to energize the circuit loops and illuminate the related lamps, the number of lamps illuminated being dependent upon the rate of deceleration of the vehicle. The number of lamps illuminated indicates to the driver of a trailing vehicle how rapidly the vehicle using the invention system is slowing down so that he or she may react accordingly.

DETAILED DESCRIPTION OF THE PREFERRED EMBODIMENT

Figure 1:
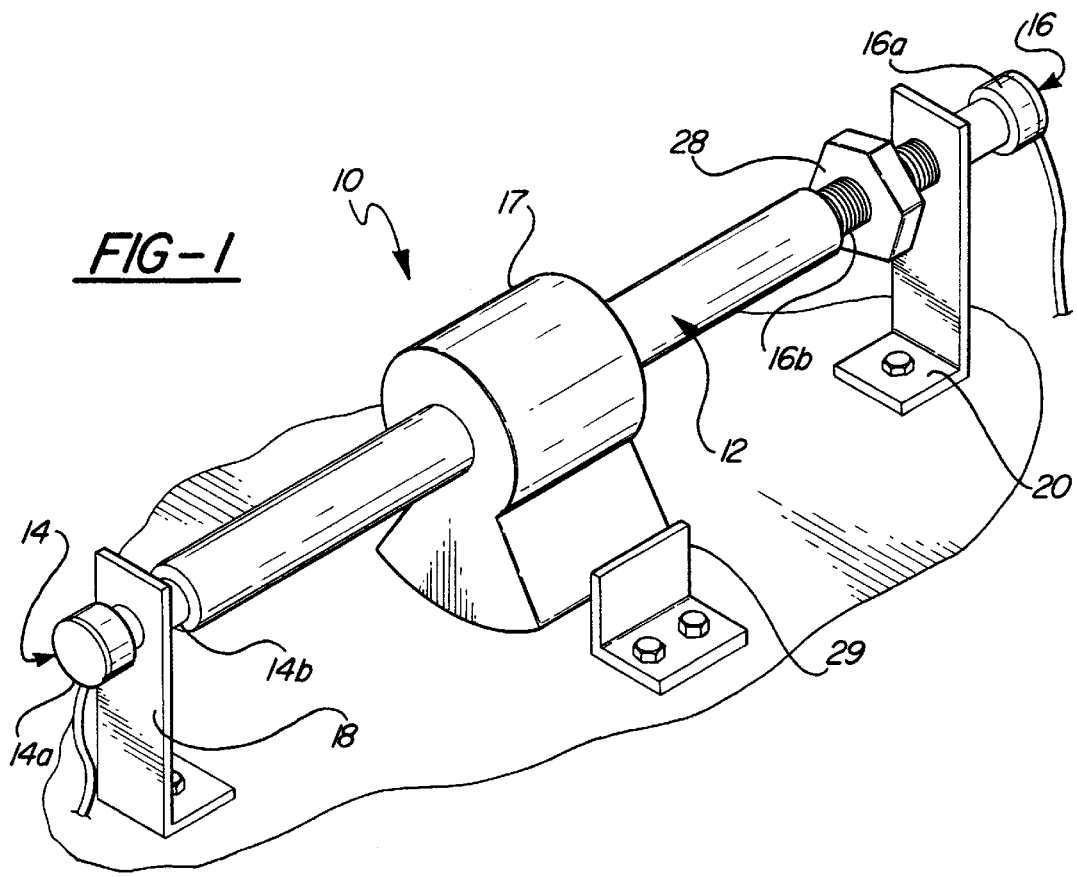
FIG. 1 is a perspective view of a deceleration sensor according to the present invention.
Figure 2:
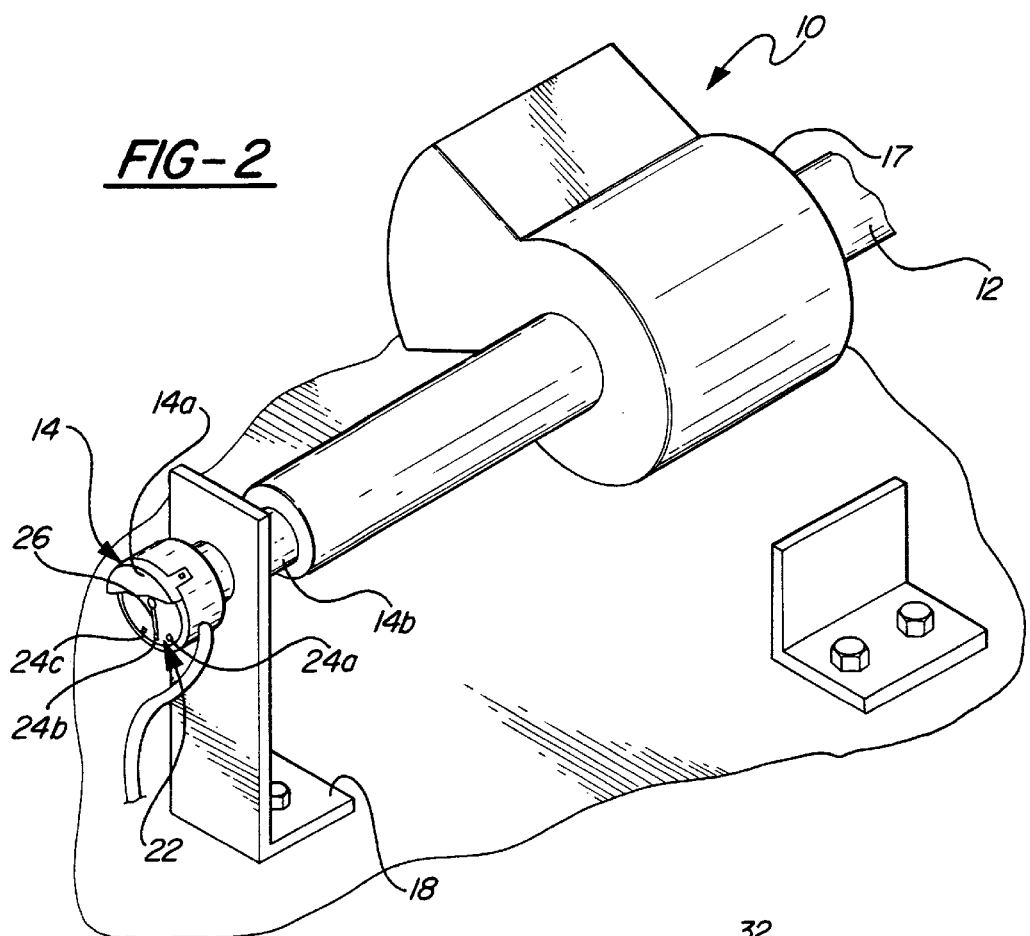
FIG. 2 is a partial perspective view of the apparatus of FIG. 1 when subjected to a medium level of deceleration.

Referring now to FIGS. 1 and 2, a deceleration sensor 10 according to the present invention includes a shaft 12, first and second rotary electric switches 14, 16 disposed at opposite ends of the shaft, and a pendulum 17 fixed to the shaft near its center. Each rotary switch comprises a generally cylindrical body 14a, 16a which houses a switch mechanism and a selector knob 14b, 16b rotatable relative to the body in order to actuate the switch. Switch bodies 14a, 16a are fixed to respective mounting brackets 18, 20 which are in turn connected to the vehicle. Selector knobs 14b, 16b are fixed to shaft 12 so that rotation of the shaft causes the selector knobs to rotate with respect to the switch bodies.

Rotary switches 14, 16 are generally similar to those commonly used in electrical circuit applications. The switches comprise circuitry 22 housed inside the body (see FIG. 2) including a plurality of electrical contacts 24a–c spaced from one another along the circumference of the switch. A contact arm 26 is connected to selector knob 14b for rotation therewith about the axis of the switch, the contact arm making electrical connection with contacts 24a–c in sequence as the selector knob rotates. The rotary switch bodies 14a, 16a are fixed to their respective mounting brackets 18 to resist rotation by, for example, passing a threaded portion of the switch body through a hole formed in the mounting bracket and tightening a nut 28 over the threaded portion. This must, of course, be accomplished prior to connecting switch selector knobs 14b, 16b to the ends of shaft 12. Switch selector knobs 14b, 16b are fixed to shaft 12 to rotate along with the shaft. This is conveniently accomplished by, for example, forming the end of each selector knob as a non-circular cross-section which fits into a correspondingly shaped hole formed in the end of the shaft.

Movement of the pendulum toward the rear of the vehicle (in the counterclockwise direction as viewed in FIGS. 1 and 2), such as would be caused by acceleration of the vehicle, is inhibited by positioning of a backstop 29 immediately adjacent the rear surface of the pendulum. Backstop 29 is secured to some portion of the vehicle structure in a conventional manner. The surface of backstop 29 which pendulum 17 contacts may comprise an energy absorbing material to minimize rebound of the pendulum in the forward direction.

In one possible embodiment of the invention deceleration sensor, the components have the following dimensions: shaft 12 is approximately 6 inches (in.) long and 0.5 in. in diameter; and pendulum 17 comprises a central cylindrical portion approximately 1.5 in. in diameter and 1.5 in. long, and a lower, arcuate section extending approximately 1 in. outwardly from the cylindrical portion.

The rotary switches are substantially similar to conventionally used rotary switches except that whereas conventional switches generally have mechanical detents to cause the switch to "snap" into and out of each switch position, the switches as used in the present invention have no detents so that the selector knob and contact arm rotates smoothly between the switch positions, with little or no resistance thereto.

Figure 3:
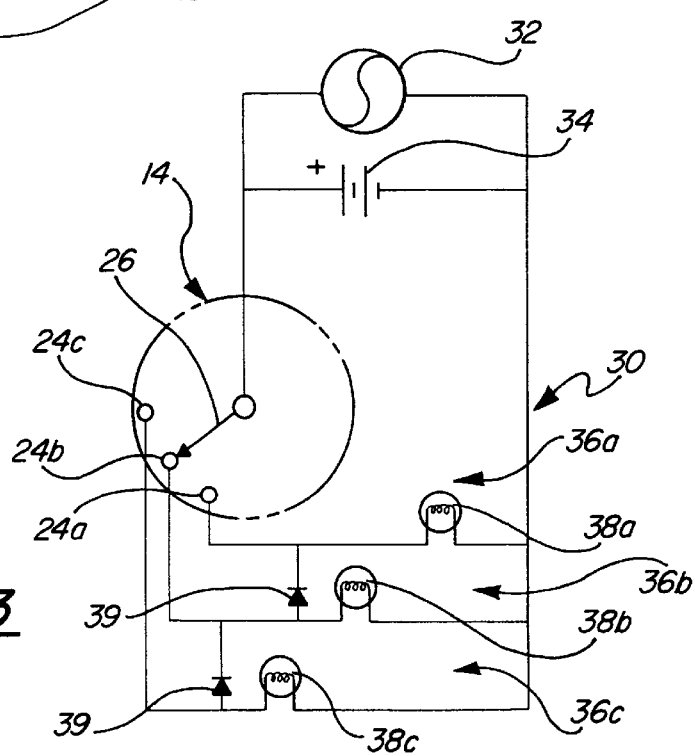
FIG. 3 is a schematic diagram of an electrical circuit associated with the deceleration measuring device.

FIG. 3 depicts an electrical circuit 30 associated with one of the rotary switches. A similar circuit is associated with the other rotary switch, and the following description is accordingly applicable to both circuits. Circuit 30 is supplied with power by an engine-driven alternator 32 and a battery 34 connected in parallel, as is typical of most automotive electrical systems. The circuit comprises three parallel, cascaded circuit loops 36a–c, each loop containing a deceleration indicator lamp 38a–c respectively. The term "cascaded circuit" is used herein to refer to a circuit wherein movement of the switch in sequence through alternative closed switch positions results in the illumination of an increasing number of lamps. In circuit 30, this is achieved by connecting the lamps in three parallel loops connected to contacts 24a–c respectively and placing diodes 39 in the circuit as shown to permit the flow of current in only one direction. The resulting circuit has four possible states: 1) When contact arm 26 connects with contact 24a, only lamp 38a is illuminated; 2) when the contact arm is rotated to connect with contact 24b, lamps 38a and 38b are illuminated; 3) when the contact arm reaches contact 24c, all three deceleration indicator lamps are illuminated; and 4) when the contact arm is not connected with any of the contacts, all the lamps are extinguished.

Rotary switch 14 and pendulum 17 are oriented with respect to one another such that when the pendulum is at rest and hanging vertically downward from shaft 12, the switch is open and no lamps are illuminated. This state of switch 14 would be that in which contact arm is at the six o'clock position as viewed in FIGS. 2 and 3. When deceleration sensor 10 is subjected to a relatively small amount of deceleration in the direction transverse to the longitudinal axis of shaft 12, inertia causes pendulum 14 to swing a small amount in the clockwise direction. Shaft 12 is thus rotated in the clockwise direction and switch selector knob 14b rotates along with the shaft to move contact arm 26 into connection with contact 24a, thus closing circuit loop 36a and illuminating the first lamp 38a. When deceleration sensor 10 is subjected to a somewhat greater rate of deceleration, pendulum 17 swings farther forward to rotate shaft 12 enough to bring contact arm 26 into connection with contact 24b and illuminate lamps 38a and 38b. This state of the mechanism is depicted in FIGS. 2 and 3, in which, for clarity of description, contact arm 26 of the rotary switch is shown as being aligned with the centerline of the pendulum. When deceleration sensor 10 is subjected to an even greater rate of deceleration, pendulum 17 swings to a near horizontal position, rotating shaft 12 enough to bring contact arm 26 into connection with contact 24c and illuminate all three lamps.

Figure 4:
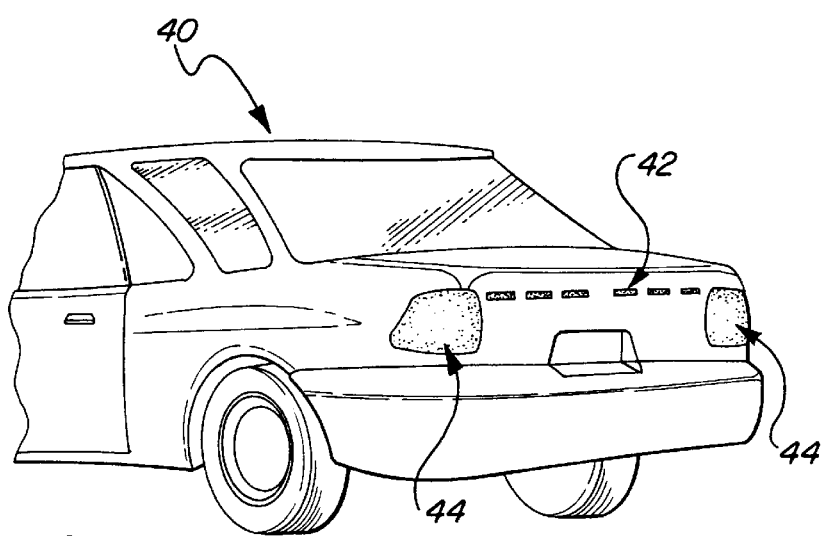
FIG. 4 is a perspective view of indicator lamps according to the present invention disposed on the rear of a vehicle.

FIG. 4 depicts a preferred way in which the deceleration indicator lamps 38a–c may be disposed on the rear of a vehicle 40. The lamps are arranged in a substantially linear array 42 extending across the rear of the vehicle above a pair of conventional, brake lights 44 mounted at outboard positions on the vehicle's rear bumper. The three indicator lamps on the left side of array 40 are connected to the circuit associated with the left-hand rotary switch 14 and the three indicator lamps on the right side of the array are connected to the circuit associated with the right-hand rotary switch 16. In each set of three indicator lamps, the light closest to the center line of the vehicle corresponds to lamp 38a, the middle light corresponds to lamp 38b, and the outermost light corresponds to lamp 38c.

In operation, when vehicle 40 decelerates pendulum 17 swings forward (clockwise as seen in FIGS. 1 through 3), rotating the shaft 12 and the selector knobs 14b, 16b of the two rotary switches. Rotation of the selector knobs causes the associated contact arms 26 to rotate along therewith and come into circuit-closing contact with the contacts 24a–c in sequence. A relatively low rate of deceleration causes pendulum 17 and contact arms 26 to rotate only far enough to illuminate the two innermost lamps on each side of the vehicle. A higher rate of deceleration causes the pendulum to swing forward by a greater amount, thus illuminating the innermost four lamps of lamp array 42. A high rate of deceleration, such as would be caused by hard braking or a collision, causes the pendulum to swing forward nearly 90 degrees and so cause contact arms 26 to close all three of the circuit loops and so illuminate all six of the lamps of the array. When vehicle 40 is no longer experiencing deceleration, the pendulum swings back toward the vertical position and the lamps are extinguished.

The use of two independent rotary switches and circuit configurations results in a degree of redundancy, so that should one of the circuits or switches fail, the remaining operative set of three lamps will continue to provide deceleration warning to following traffic. Alternatively, it is possible to use a single rotary switch and circuit for energizing all of the lamps of the array. In one possible single-switch embodiment of the invention, rotation of the contact arm to the first contact would illuminate the innermost two lamps, rotation of the contact arm to the second contact would illuminate the innermost four lamps, and rotation of the contact arm to the third contact would illuminate all six lamps.

The invention deceleration sensor does not depend on vehicle braking but rather may be actuated by any deceleration of the vehicle, whether accompanied by brake activation or not. The invention functions as a safety device and may be adapted to different customer requirements or diverse environments. For example, more than three indicator lamps and circuit loops may be provided so that the invention is able to indicate vehicle deceleration to a finer degree of accuracy. Also, the invention may be used on vehicles other than automobiles and trucks. It may be installed as original equipment by an vehicle manufacturer, or may be sold in kit form for retrofit by a vehicle owner or operator.

Whereas a preferred embodiment of the invention has been illustrated and described in detail, it will be apparent that various changes may be made in the disclosed embodiment without departing from the scope or spirit of the invention.

What is claimed is:

1. A deceleration sensor and indicator system for measuring a rate of deceleration experienced by a vehicle and signaling the rate of deceleration to persons outside of the vehicle, the system comprising:

a shaft having a longitudinal axis, a first end and a second end;

a pendulum fixed to the shaft between the ends thereof;

a first rotary electric switch having a first part housing a plurality of spaced electrical contacts and a second part movable with respect to the first part for sequentially making contact with the electrical contacts, the second part being attached to the first end of the shaft for rotation therewith;

means for mounting the first part of the rotary switch to the vehicle such that the shaft and the second part of the rotary switch rotate as the pendulum swings by inertia with respect to the vehicle about the longitudinal axis of the shaft to actuate the rotary switch; and signaling means connected to the rotary switch for actuation thereby to provide a visual indication of the rate of deceleration of the vehicle as determined by the amount of rotation of the shaft about the longitudinal axis.

2. Apparatus according to claim 1 wherein the signaling means comprises at least one lamp.

3. Apparatus according to claim 1 wherein the signaling means comprises:

a plurality of lamps; and an electric circuit for energizing the lamps and having a plurality of cascaded circuit loops configured to be closed in a sequential manner by the rotary switch, each of said loops being connected to at least one of the lamps such that rotation of the second part of the rotary switch from one contact to the next results in illumination of an increasing number of the lamps.

4. Apparatus according to claim 3 wherein the plurality of lamps are arranged in a substantially linear array adapted for mounting on the vehicle, the array comprising at least one inner lamp disposed adjacent a center of the array and connected to the electric circuit for energization by the switch in response to a relatively low rate of deceleration, and at least two outer lamps disposed at opposite ends of the array and connected to the electric circuit for energization by the switch in response to a relatively high rate of deceleration.

5. Apparatus according to claim 1 further comprising:

a second rotary electric switch attached to the second end of the shaft; and means for mounting the second rotary switch to the vehicle such that rotation of the shaft and the pendulum about the longitudinal axis of the shaft actuates the second rotary switch substantially simultaneously with the first rotary switch.

6. Apparatus according to claim 5 wherein the signaling means comprises:

a first and a second group of lamps;

a first plurality of cascaded circuit loops configured to be closed in a sequential manner by the first rotary switch, each of said loops being connected to energize at least one of the lamps of the first group; and a second plurality of cascaded circuit loops configured to be closed in a sequential manner by the second rotary switch, each of said loops being connected to energize at least one of the lamps of the second group.

7. Apparatus according to claim 6 wherein the first and second groups of lamps are arranged in a substantially linear array adapted for mounting on the vehicle, the array comprising a first and a second inner lamp disposed adjacent a center of the array and connected to the first and second plurality of cascaded circuit loops respectively for energization by their respective switches in response to a relatively low rate of deceleration, and first and second outer lamps disposed adjacent opposite ends of the array and connected to the first and second cascaded circuit loops respectively for energization by their respective switches in response to a relatively high rate of deceleration.

8. Apparatus according to claim 1 further comprising means for limiting the amount of rotation of the shaft due to acceleration of the vehicle.

9. Apparatus according to claim 8 wherein the means for limiting the amount of rotation of the shaft comprises a back stop mountable to the vehicle adjacent to the pendulum to inhibit movement of the pendulum beyond a vertical position toward a rear end of the vehicle.

10. A deceleration sensor and indicator system for measuring a rate of deceleration experienced by a vehicle and signaling the rate of deceleration to persons outside of the vehicle, the system comprising:

a shaft having a longitudinal axis, a first end and a second end;

a pendulum fixed to the shaft between the ends thereof;

a first rotary electric switch attached to the first end of the shaft;

a second rotary electric switch attached to the second end of the shaft;

means for mounting the first and second rotary switches to the vehicle such that the shaft and the pendulum are suspended between the rotary electric switches and are rotatable with respect to the vehicle about the longitudinal axis of the shaft to actuate the rotary switches by inertia;

a first and a second group of lamps;

a first electric circuit for energizing the first group of lamps and having a plurality of cascaded circuit loops configured to be closed in a sequential manner by the first rotary switch, each of said loops being connected to at least one of the lamps of the first group such that rotation of the first rotary switch results in illumination of an increasing number of the lamps of the first group; and a second electric circuit for energizing the second group of lamps and having a plurality of cascaded circuit loops configured to be closed in a sequential manner by the second rotary switch, each of said loops being connected to at least one of the lamps of the second group such that rotation of the second rotary switch results in illumination of an increasing number of the lamps of the second group.

11. Apparatus according to claim 10 wherein the first and second groups of lamps are arranged in a substantially linear array adapted for mounting on the vehicle, the array comprising:

a first inner lamp disposed adjacent a center of the array and connected to the first electric circuit for energization by the first rotary switch in response to a relatively low rate of deceleration;

a second inner lamp disposed adjacent a center of the array and connected to the second electric circuit for energization by the second rotary switch in response to a relatively low rate of deceleration;

a first outer lamp disposed adjacent a first outer end of the array and connected to the first cascaded circuit loop for energization by the first rotary switch in response to a relatively high rate of deceleration; and a second outer lamp disposed adjacent a second outer end of the array and connected to the second cascaded circuit loop for energization by the second rotary switch in response to a relatively high rate of deceleration.

* * * * *